United States Patent Office 2,718,472
Patented Sept. 20, 1955

2,718,472

PASTE COMPOSITION

Ike Dovberg and Maurice S. Dovberg, Philadelphia, Pa.

No Drawing. Application July 9, 1952,
Serial No. 298,006

6 Claims. (Cl. 106—187)

This invention relates generally to a paste composition and more particularly to the preparation of a wallpaper paste which is nonstaining in character, which is colorless, odorless and neutral in its composition and which completely eliminates the necessity of employing any wall sizing when the paste is employed for hanging wallpaper and the like.

While the preparation of the present invention is particularly adapted for use as a wallpaper paste, primarily because of its nonstaining properties and because it eliminates the step of sizing the surface to be papered, it is equally well adapted for general pasting purposes.

In addition, the paste preparation of the present invention has been found to be of real and substantial value as an additive to conventional premixed starch, flour and other pastes such as are presently in use, the addition of the preparation of the present invention to such prepared pastes having the effect of imparting thereto nonstaining and size-eliminating properties which they did not originally possess.

In preparing the composition of the present invention, there is preferably first produced a mixture which contains the following listed ingredients in approximately the proportions by weight as indicated:

|  | Pounds |
|---|---|
| Salt (common) | 100 |
| Corn sugar (dextrose) | 100 |
| Dextrine (white powdered) | 48 |
| Dextrine (yellow powdered) | 4 |
| Sodium ortho phenylphenate tetrahydrate | 5 |
| Liquid phenol (1 quart) and tincture of gum aloes (1 pint) | 3 |

In producing the above initial mixture, the salt and corn sugar are well mixed together with the white and yellow powdered dextrine by high speed agitation to obtain a thoroughly mixed, homogeneous mass of these dry solids and thereafter, during continued agitation of the mass, the liquid phenol and tincture of gum aloes, preliminarily mixed together, are introduced drop by drop into the mass until all of this liquid is fully and uniformly absorbed throughout the powdered mass.

Preferably, the liquid phenol and tincture of gum aloes is introduced into the dry, powdered mass by injection through the use of devices such as are employed for hypodermic or intravenous injection, the drop by drop introduction of the liquid into the powdered mass being of importance in that such procedure not only insures complete absorption and uniform distribution of the liquid in the powdered mass but also prevents localized solidification of the mass in the form of undesirable lumps.

After the powdered mass has been thoroughly and evenly mixed to obtain a homogeneous blend of its constituent ingredients, the mass is sifted through a suitably fine mesh screen to produce a finely comminuted dry powdered composition which is then mixed with sucrose and methyl-cellulose in the following approximate proportions to produce the final composition of the present invention:

|  | Pounds |
|---|---|
| Dry powdered composition as above prepared | 260 |
| Methylcellulose | 400 |
| Sugar (sucrose) | 300 |

It will be noted that the dry, comminuted ingredients which constitute this final composition are present in approximately the following proportions of the total weight of the composition: salt—about 10.4%; sugar—about 41.7%; methylcellulose—about 41.7%; dextrine—about 5.5%; and the alkali metal salt of ortho phenylphenate tetrahydrate—about 0.8%.

While it is possible to originally mix the sucrose and methylcellulose with the salt, corn sugar and other constituents of the dry powdered composition prepared as described hereinbefore and so produce directly the final composition, it has been found that the better procedure is to initially prepare the salt-corn sugar-dextrine composition and thereafter add thereto the sucrose and methylcellulose, because by so doing there is less likelihood of any localized solidification occurring in the powered mass.

The final composition may be employed in its powdered state or measured quantities thereof may be dampened slightly with water or water and glycerine and then suitably baked or compressed into the form of briquettes or tablets of any convenient shape, size and weight. Whether in dry powdered state or in the shape of briquettes or tablets, the final composition of the present invention produced as above described is highly soluble in water and mixes readily in combination with any of the conventionally prepared starch pastes to provide the latter with nonstaining and size-eliminating properties.

For preparing a suitable wallpaper paste which is nonstaining in character and which eliminates the necessity of sizing the surface to be papered, approximately seven ounces of the final composition, either briquetted or in its dry, powdered state, are dissolved in six quarts of water, the resulting paste having excellent adhesive properties.

Where the composition is employed as an additive to prepared pastes or paste mixtures, satisfactory nonstaining and wall size-eliminating properties are imparted to the latter by mixing thereto the additive in dry or liquid form in an amount equal to about 5 per cent by volume of the paste.

It has been found that the composition of the present invention has exceedingly high water absorptive properties and that when dissolved in water it results in the production of a heavy-bodied, highly viscous liquid paste having remarkably high adhesive properties, which is neutral in composition and practically colorless, and which is not subject to spoilage or deterioration through souring, fermentation or precipitation of its constituent ingredients. On the contrary, the liquid paste formed by dissolution of the above composition in water remains stable and retains its adhesiveness indefinitely.

It will be understood, of course, that the composition above described may be modified from time to time particularly in the proportions of its constituent ingredients, without departing from the general principles or real spirit of the present invention, and it is accordingly desired that the formulae and procedure hereinbefore described be considered in all respects as illustrative and not restrictive, and that the scope of the invention is to be as indicated by the appended claims.

What is claimed as new and useful is:

1. A paste composition of the character described comprising, in combination, a mixture of common salt, sugar, dextrine, methylcellulose and an alkali-metal salt of ortho phenylphenate tetrahydrate in dry, comminuted state homogeneously impregnated with liquid phenol and tincture of gum aloes, wherein said dry, comminuted ingredients are present in approximately the following proportions of the total weight of the composition: salt—about 10.4%; sugar—about 41.7%; methylcellulose—about 41.7%; dextrine—about 5.5%; and alkali-metal salt of ortho phenylphenate tetrahydrate—about 0.8%.

2. A paste composition as defined in claim 1 wherein said sugar is present in the form of 3 parts of sucrose to 1 part of corn sugar.

3. A paste composition as defined in claim 1 wherein said dextrine is present in the form of approximately 12 parts of white dextrine to 1 part of yellow dextrine.

4. A paste composition of the character described comprising a compressed unit of common salt, sugar, dextrine, methylcellulose and an alkali-metal salt of ortho phenylphenate tetrahydrate mixed together in dry, comminuted state and impregnated with liquid phenol and tincture of gum aloes, wherein said dry, comminuted ingredients are present in approximately the following proportions of the total weight of the composition: salt—about 10.4%; sugar—about 41.7%; methylcellulose—about 41.7%; dextrine—about 5.5%; and alkali-metal salt of ortho phenylphenate tetrahydrate—about 0.8%.

5. A paste preparation comprising an aqueous solution of a mixture of salt, sugar, dextrine, methylcellulose and an alkali-metal salt of ortho phenylphenate tetrahydrate combined in dry, powdered state and impregnated with liquid phenol and tincture of gum aloes, wherein said dry, comminuted ingredients are present in approximately the following proportions of the total weight of the composition prior to solution in water: salt—about 10.4%; sugar—about 41.7%; methylcellulose—about 41.7%; dextrine—about 5.5%; and alkali metal salt of ortho phenylphenate tetrahydrate—about 0.5%.

6. A paste preparation as defined in claim 5 wherein approximately 7 ounces of said mixture are dissolved in 6 quarts of water.

References Cited in the file of this patent

UNITED STATES PATENTS

| | | |
|---|---|---|
| 629,006 | Evershed | July 18, 1899 |
| 2,085,052 | Taylor | June 29, 1937 |
| 2,190,372 | Adams | Feb. 13, 1940 |
| 2,204,384 | Salisbury | June 11, 1940 |
| 2,340,072 | Medl | Jan. 25, 1944 |
| 2,362,761 | Medl | Nov. 14, 1944 |
| 2,486,216 | Silvernail | Oct. 25, 1949 |
| 2,577,821 | Smith et al. | Dec. 11, 1951 |

OTHER REFERENCES

Gregory: "Uses and Applications of Chemicals and Related Materials" (1939), page 21.